United States Patent [19]

Walker

[11] Patent Number: 4,736,574
[45] Date of Patent: Apr. 12, 1988

[54] HARVESTING AID

[76] Inventor: David L. Walker, 493 W. Caruthers Ave., Caruthers, Calif. 93609

[21] Appl. No.: 65,167

[22] Filed: Jun. 19, 1987

Related U.S. Application Data

[63] Continuation of Ser. No. 738,101, May 23, 1985, abandoned.

[51] Int. Cl.⁴ .................... A01D 46/00; A01D 91/04
[52] U.S. Cl. .......................................... 56/328.1; 56/1; 56/DIG. 2
[58] Field of Search ................................ 56/1, DIG. 2

[56] References Cited

U.S. PATENT DOCUMENTS

| | | |
|---|---|---|
| 2,929,184 | 3/1960 | Lamouria . |
| 2,940,615 | 6/1960 | Long et al. . |
| 3,380,236 | 4/1968 | Shepardson . |
| 3,475,886 | 11/1969 | Hart ................. 56/DIG. 2 |
| 3,490,217 | 1/1970 | Olmo et al. . |
| 3,492,801 | 2/1970 | Olmo et al. . |
| 3,628,319 | 12/1971 | Moore . |
| 3,715,876 | 2/1973 | McCord . |
| 3,825,087 | 7/1974 | Wilson . |
| 3,834,137 | 9/1974 | Long . |
| 3,902,304 | 9/1975 | Mitchell et al. . |
| 3,990,217 | 11/1976 | Aoyama ................. 56/1 |
| 4,179,873 | 12/1979 | Scudder . |
| 4,255,922 | 3/1981 | Hiyama et al. . |
| 4,292,784 | 10/1981 | Abatti et al. .......... 56/DIG. 2 |
| 4,321,786 | 3/1982 | Burton . |
| 4,498,277 | 2/1985 | Bennett et al. ................. 56/1 |
| 4,503,660 | 3/1985 | Kelderman .......... 56/DIG. 2 |

Primary Examiner—Paul J. Hirsch
Attorney, Agent, or Firm—Townsend & Townsend

[57] ABSTRACT

A harvesting aid for fruit, particularly vine-borne fruit such as grapes, includes a steerable, self-propelled vehicle configured for straddling the row and supporting workers on either side of the vines. Workers sever the fruit and deposit it on a conveyor assembly which moves the fruit to a discharge point. The conveyor assembly includes a right angle conveyor segment for changing the direction of the movement of the fruit. Workers on one side deposit fruit directly onto a conveyor belt. Workers on the other side deposit fruit onto downwardly sloping pivotal diverter plates, positioned along the center line of the vehicle, having lower, outer ends above the conveyor belt. The diverter plates pivot out of the way when a vine trunk or stake is encountered as the vehicle moves down a row in either direction. The wheels of the vehicle are independently steerable over at least 90° for maneuverability and for allowing the vehicle to maintain a constant azimuthal orientation.

5 Claims, 3 Drawing Sheets

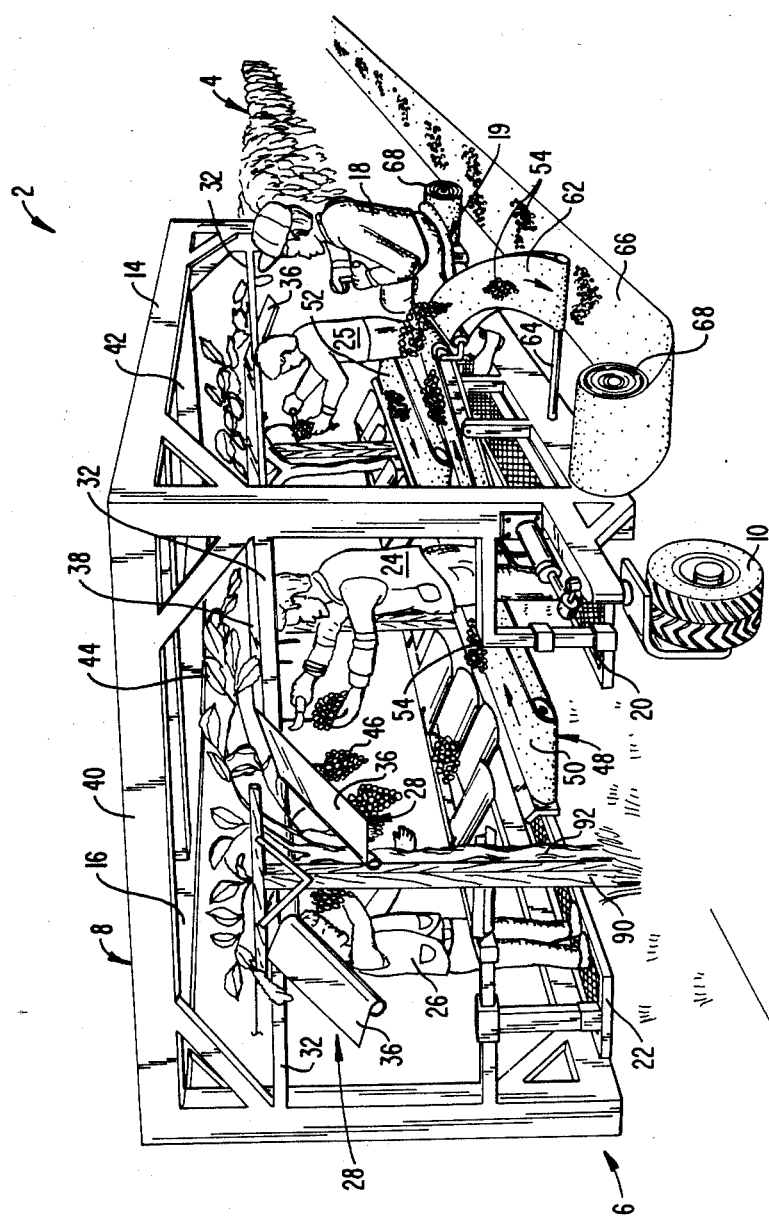
FIG._1.

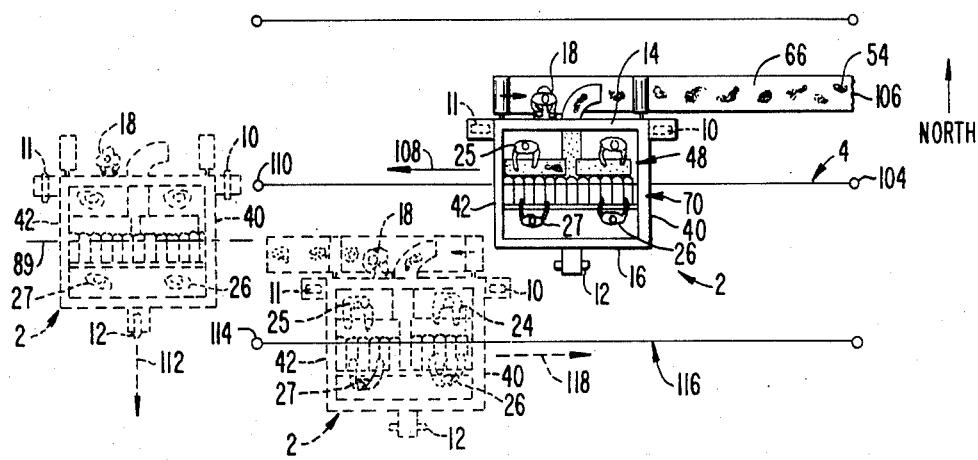
FIG._2.
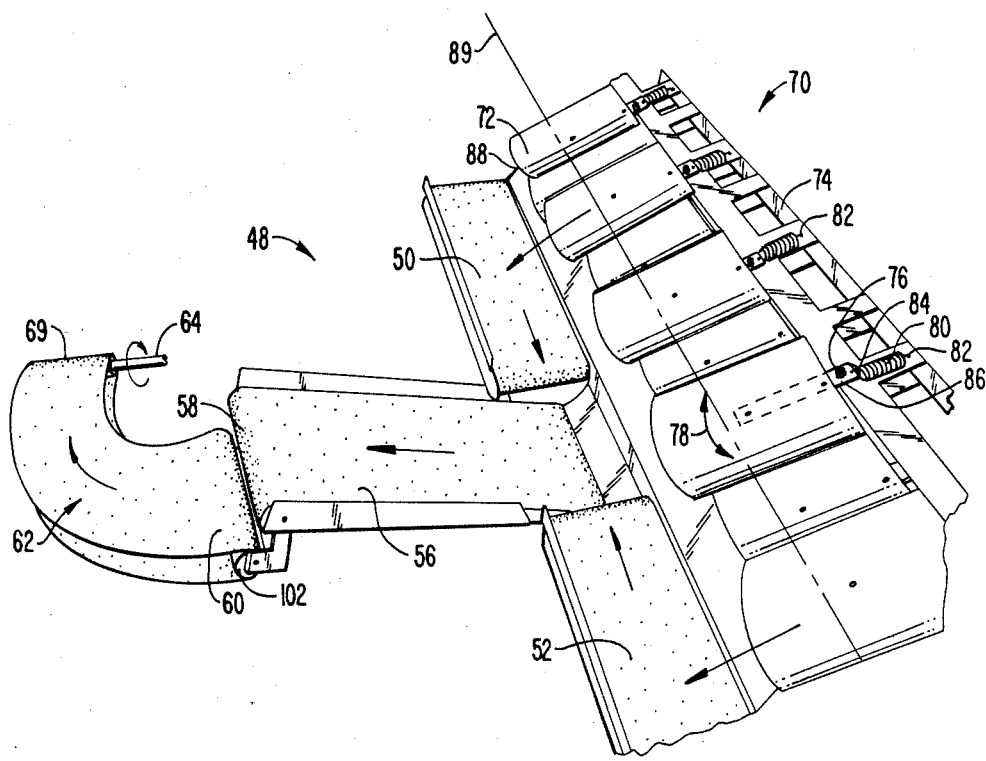
FIG._3.

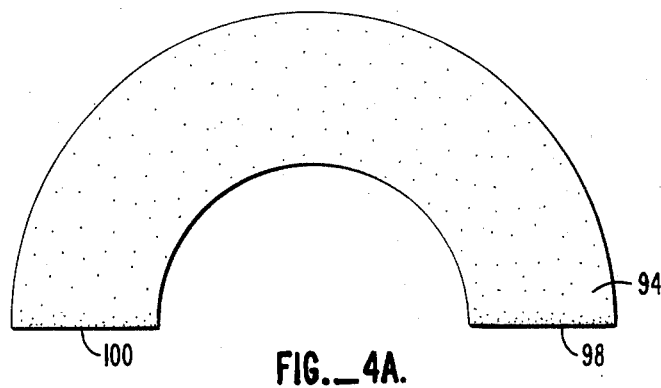
FIG._4A.
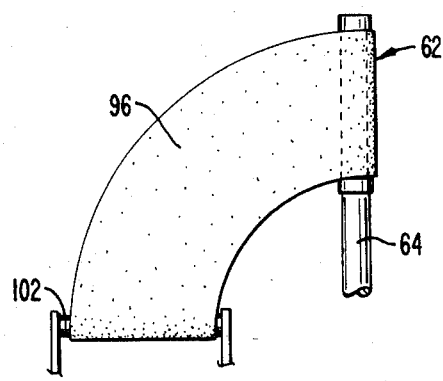
FIG._4B.
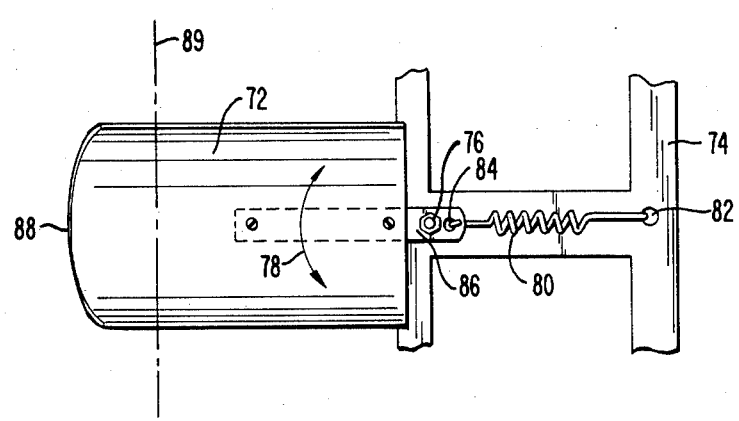
FIG._5.

HARVESTING AID

This is a continuation of application Ser. No. 738,101 filed May 23, 1985, now abandoned.

BACKGROUND OF THE INVENTION

This invention relates to a harvesting aid for fruit, particularly vine-borne fruit such as grapes, specifically a vehicular harvesting aid which transports workers down a row of vines to allow the workers to sever the fruit while at their work stations and have the severed fruit automatically conveyed to a discharge point on the vehicle.

Grape harvesting is done either manually, primarily by migrant workers, or mechanically using automated grape harvesting machines. Although hand picking is usually preferred, the cost is high and the future availability of migrant workers is unsure. Therefore much effort has been put into the development of mechanical grape harvesters.

Grape harvesting machines fall into two broad categories: selective and non-selective. Selective machines have been designed so that only whole bunches of ripe grapes are removed from the vines. None of the selective grape harvesters made to date has been commercially successful.

Non-selective grape harvesting machines either beat or shake the individual berries from the grape vines. Several manufacturers are commercially producing machines which do this. Since the grape berries are shaken or beaten from the vine, severe damage is usually done to the berry. This always precludes their use for raisin or for table grapes. Some wine grape varieties cannot withstand the violent treatment of these mechanical grape harvesters.

In the early 1960's some machines were developed for moving workers through a vineyard for harvesting wine grapes. These machines were not very successful and were abandoned in favor of non-selective mechanical harvesters. Therefore, at present all whole bunch grape harvesting is done by hand, primarily by migrant workers When picking raisin grapes, which must be picked by the whole bunch, the worker commonly carries a circular pan which is filled with about 20 pounds of grapes that the worker has cut from the vines. The pan is carried to the middle of the path between the rows of grapes. The grapes are spread on paper trays lying on the ground so that the grapes are dried by the sun. The worker then carries the pan back to the vine and starts the process all over again.

An average worker will pick 350 trays of grapes per day. Time and motion studies show that the worker spends about one-third of his or her time cutting the grape bunches and the remaining moving to and from the paper trays and spreading the grapes on the paper trays.

SUMMARY OF THE INVENTION

The present invention is directed to a harvesting aid for fruit, particularly vine-borne fruit such as grapes, that are harvested on a selective basis. The invention greatly increases the productivity of the worker by eliminating the time and effort necessary to move the pan, into which the fruit is gathered, to and from a collection point in the field. When used for harvesting sun-dried fruit such as raisins, the time and effort needed to spread the grapes on the drying paper is also saved.

The harvesting aid for vine-borne fruit includes a steerable, self-propelled vehicle configured to move along a row of plants while straddling the row. The vehicle has worker support stations for positioning workers on either side of the plants as the vehicle moves down the row. A conveyor assembly is carried by the vehicle for conveying the severed fruit to a discharge point. When picking raisin grapes, the fruit is discharged directly onto a roll of paper laid out on the ground along one side of the vehicle as it moves down the row.

Workers on one side of the row deposit fruit directly onto a conveyor belt positioned just in front of them. Workers on the other side of the row deposit the fruit they sever from the plants onto pivotal diverter plates. The diverter plates are positioned at a downwardly sloping angle with the lower, outer end of the diverter plates positioned above the conveyor belt. The diverter plates are pivotally mounted to the vehicle frame so they pivot out of the way when an obstruction, such as the trunk of a vine or a stake, is encountered. The plates are each biased to a neutral, center position and can pivot in either direction from the neutral position. This allows the vehicle to move down a row in either direction.

The wheels of the vehicle are independently steerable so that once the vehicle has moved past the end of one row, the wheels are pivoted 90°, the vehicle is driven until it is aligned with the next row, the wheels are pivoted 90° and the vehicle commences going down the next row in the direction opposite that it moved down the preceding row. Thus the vehicle can change directions in a minimum of space and maintain the same azimuthal orientation when harvesting a field having straight, parallel rows. Also, when the vehicle uses a side-discharge conveyor, such as is used for spreading grapes to dry, the side discharge conveyor remains on the same side of the vine rows. This helps the discharged fruit from being in the way of the next pass of the harvesting aid. When drying grapes it also permits the grapes to be laid out for best sun exposure.

The conveyor assembly includes a right angle conveyor segment for changing the direction of the movement of the fruit. Foliage lifters are mounted to the frame and are used to lift up foliage which would otherwise obscure the fruit from the worker.

A primary advantage of the present invention is that it allows the worker to be much more productive while providing the worker with a much better working environment. When harvesting raisin grapes the present invention eliminates the stoop labor aspect of grape harvesting. Since the worker no longer needs to lug around a filled pan of grapes, bend over and spread the grapes on the drying paper and return to the vines, which has been shown to take up two-thirds of the worker's time, the worker can be much more productive while eliminating the negative stoop labor aspects of grape harvesting. The harvesting of other fruit, such as wine grapes, can also be speeded up since the workers no longer have to carry their loaded baskets or boxes to a gondola or other receptacle. With the present invention, the worker does the job which has to date not been suitable for mechanization—that is, the selection and severing of ripe fruit without damaging the fruit. The remaining tasks of gathering the fruit and spreading fruit to dry are accomplished using mechanized equipment.

The invention also creates better working conditions for the worker by providing a relatively comfortable work station from which to select and sever the fruit. The worker can be shaded from the direct sun by the vehicle. If desired, the vehicle can be semi-enclosed to provide the worker with a controlled or semi-controlled temperature environment. The invention thus reduces the cost of the harvest by requiring fewer workers to do the job since the workers are more productive. Because the physical demands on the workers are reduced, local workers can be used for the harvest. This is important since the almost total reliance on migrant workers, many of whom are illegal aliens, would no longer be required.

Other features and advantages of the invention will appear from the following description in which the preferred embodiment has been set forth in detail in conjunction with the accompanying drawings.

BRIEF DESCRIPTION OF THE DRAWINGS

FIG. 1 is a simplified perspective view showing the harvesting aid of the invention traveling down a row of grape vines.

FIG. 2 is a top schematic view showing the movement of the harvesting aid down adjacent rows.

FIG. 3 is a perspective view showing the pivotal diverter plate assembly and the conveyor assembly of the harvesting said of FIG. 1.

FIG. 4A shows the pattern for the right angle conveyor segment of FIG. 3.

FIG. 4B is a top view of the right angle conveyor segment of FIG. 3.

FIG. 5 is a simplified, enlarged top view of a diverter plate and its biasing spring.

DETAILED DESCRIPTION OF THE PREFERRED EMBODIMENT

Turning to FIGS. 1 and 2, a harvesting aid 2 is shown moving along a row of grapes 4. Harvesting aid 2 includes a self-propelled vehicle 6 having a vehicle frame 8 and three wheels 10, 11 and 12. Wheels 10 and 11 are on a first side 14 of vehicle 6 while wheel 12 is on a second side 16. Each wheel 10–12 is individually driven by a hydraulic motor, not shown, and steered by an operator 18 seated on first side 14 at a driver station 19. U.S. Pat. No. 3,825,087 to Wilson shows an example of a wide-span tractor having individually driven, steerable wheels. The specific construction of the wheel driving mechanism and wheel steering mechanism are not a part of this invention and thus will not be described in further detail.

First and second worker support platforms 20, 22 are mounted to frame 8 and are used to support workers 24–27. A pair of foliage lifters 28 are mounted to frame 8 by cross bars 32. Foliage lifters 28 include downwardly and outwardly angled outer sections 36 and generally horizontal center sections 38 extending between angled outer sections 36. As harvesting aid 2 moves along row 4, regardless of which end 40 or 42 is leading excess foliage 44 is lifted up by angled outer sections 36 and maintained up away from workers 24–27 by center sections 38 so that the workers have ready access to grape bunches 46.

Referring now also to FIG. 3, a conveyor assembly 48 is shown to include first and second longitudinal conveyors 50, 52 feeding towards one another to deposit severed grape bunches 54 onto a transverse conveyor 56. The outer end 58 of conveyor 56 extends to a point adjacent and immediately above the upper end 60 of a right angle conveyor 62. Right angle conveyor 62 is driven by a drive shaft 64. Paper 66 is spread out onto the ground to the north side of row 4 by a paper roll 68, one located at each end of harvesting aid 2. The lower, discharge end 69 of conveyor 62 is positioned so it passes above paper 66.

Workers 24, 25 cut bunches 46 and deposit the severed gape bunches 54 directly onto conveyors 50, 52. To eliminate the need for a second conveyor assembly on the other side of harvesting aid 2, the invention includes a pivotal diverter plate assembly 70 mounted to frame 8 in a position centrally between sides 14, 16 of harvesting aid 2. Diverter plate assembly 70 includes a number of diverter plates 72 mounted to a support member 74 of frame 8 at three different heights. Plates 72 pivot around pivot points 76 and overlap one another vertically. Mounting plates 72 at different heights allows the plates to pivot in the direction of double ended arrow 78 without interfering with one another. Plates 72 are biased to their neutral positions, illustrated in FIGS. 3 and 5, by tension springs 80. Springs 80 connect to support member 74 at points 82 and to points 84 on bar extensions 86 of diverter plates 72. Points 76, 82 and 84 are aligned when diverter plates 72 are in their neutral positions.

Diverter plates 72 extend downwardly so that their outer edges 88 overlie longitudinal conveyors 50, 52 and transverse conveyor 56. The cross-sectional shape of plates 72 have a gentle concave configuration so that the severed grape bunches 74 slide easily down diverter plate 72 onto conveyors 50, 52, 56. Thus, workers 26, 27 simply drop their severed grape bunches 54 onto diverter plates 72 which direct bunches 54 to conveyor assembly 78.

Since diverter assembly 70 lies along the center line 89 of harvesting aid 2, diverter plate 72 must be able to pivot out of the way when an obstruction, such as a post 90 or vine trunk 92 are encountered. When they are, plates 72 move in one of the directions of double ended arrow 78 thus allowing the obstruction to pass.

Turning now to FIGS. 4A and 4B, a pattern 94 is shown. Pattern 94 is used to make the right angle conveyor belt 96. Pattern 94 typically is cut from a piece of rectangular material 4 feet long and 2 feet wide. Ends 98, 100 are jointed together to form belt 96. Belt 96 is mounted over an idler roller 102 and drive shaft 64. If desired, to reduce slippage between idler roller 102 and drive shaft 64 and portions of belt 96, idler roller 102 and drive shaft 64 may have a conical shape to reduce or eliminate such slippage. Also, idler roller 102 may be comprised of several independently rotatable segments to accommodate the different surface speeds along belt 96.

In use, harvesting aid 2 is positioned at one end 104 of row 4 with workers 24–27 and driver 18 on the harvesting aid. After securing an outer end 106 of drying paper 66 in place, harvesting aid 2 begins moving in a first direction 108 along row 4. As it does so, foliage lifters 28 lift back foliage 44 to allow workers 24, 25 to sever grape bunches 46 and deposit the bunches directly onto conveyors 50, 52 or 56. Workers 26, 27 deposit their severed grape bunches 54 onto diverter plates 72 which directs the grape bunches onto conveyor assembly 48. Grape bunches 54 are then directed along longitudinal conveyors 50, 52, onto transverse conveyor 56 and finally onto right angle conveyor 62, from which the severed grapes drop onto drying paper 66.

When harvesting aid 2 gets to an end 110 of row 4, operator 18 substantially stops harvesting aid 2, turns wheels 10-12 90° and moves harvesting aid 2 in a second direction 112 until harvesting aid 2 is aligned with an end 114 of an adjacent row 116. At that time, operator 18 again substantially stops harvesting aid 2 and turns wheels 10-12 90° to allow harvesting aid 2 to move in a third direction 118 along row 116, directions 108 and 118 being parallel but opposite directions. The ability to rotate the wheels 90° and to drive the wheels in either direction allow the operators to, in effect, make right angle turns thus reducing the amount of space needed to turn at the end of a row.

When drying grapes, it is necessary to keep the grapes in direct sunshine for as much time as possible. Thus, it is desirable to position paper 66 on the north side of rows 104, 116 close to the adjacent row. Since the azimuthal orientation of harvesting aid 2 need not change when moving from one row to the next, the laying out of the paper 66 and spreading severed grape bunches 54 on the paper proceeds smoothly from the same side of harvesting aid 2. This greatly reduces the complexity which would otherwise be required if it were necessary to be able to lay paper and deposit grapes from either side of the harvesting aid.

Modification and variation can be made to the disclosed embodiment without departing from the subject of the invention as defined in the following claims. For example, harvesting aid 2 can be adapted for use in harvesting other fruit instead of grapes. Although harvesting aid 2 is specially adapted for harvesting raisin grapes, it may also be advantageously used for harvesting table or wine grapes. In such case, it may be desired to modify conveyor assembly 48 to accommodate the collection of these other fruits. Diverter plates 72, which preferably overlap vertically, may be spaced apart with gaps between some or all of them.

I claim:

1. A method for harvesting fruit from rows of plants comprising the following steps:
   directing a self-propelled vehicle in a first direction along a first row of plants from a first row end to a second row end, the vehicle straddling the first row and pointing in a chosen direction as the vehicle leaves the second row end of the first row;
   positioning a working on the vehicle on each side of the row;
   removing the fruit by the workers from the plants;
   depositing the removed fruit onto a conveyor;
   conveyor the removed fruit to a discharge point on one side of the vehicle;
   substantially stopping the vehicle once the vehicle passes the second row end;
   moving the vehicle in a second direction generally perpendicular to the first direction;
   substantially stopping the vehicle when the vehicle is aligned with the second end of a second row;
   directing the vehicle in a third directon along the second row from the second row end to the first row end of said second row with the vehicle straddling the second row;
   keeping the vehicle pointed in the chosen direction during the first substantially stopping step, the moving step, the second substantially stopping step and the directing step so the discharge point is on the same side of each of said rows; and
   repeating the fruit removing, depositing and conveying steps.

2. The harvesting method of claim 1 further comprising the step of laying a length of material on the soil on said one side of the verhicle and wherein the conveying step conveys the removed fruit onto the material.

3. The harvesting method of claim 1 wherein in the depositing step a first worker on one side of the vine row deposits removed fruit directly onto a conveyor belt and a second worker on the other side of the row deposits removed fruit onto downwardly sloping pivotal diverter plates, the pivotal diverter plates terminating at a lower end positioned directly above the conveyor belt when in a neutral position, the pivotal diverter plates pivotal in at least two directions from the neutral position so to pivot out of the way when an obstruction is encountered along the row of plants regardless of whether the vehicle is moving along the row in the first direction or the second direction.

4. A method for harvesting fruit from rows of plants comprising the following steps:
   directing a self-propelled vehicle in a first direction along a first row of plants from a first row end to a second row end, the vehicle pointing in a chosen direction as the vehicle leaves the second row end of the first row;
   positioning a worker on the vehicle;
   removing the fruit by the workers from the plants;
   transporting the removed fruit to a discharge point on one side of the vehicle;
   substantially stopping the vehicle once the vehicle passes the second row end;
   moving the vehicle in a second direction generally perpendicular to the first direction;
   substantially stopping the vehicle when the vehicle is aligned with the second end of a second row;
   directing the vehicle in a third direction along the second row from the second row end to the first row end of said second row;
   keeping the vehicle pointed in the chosen direction during the first substantially stopping step, the moving step, the second substantially stopping step and the directing step so the discharge point is on the same side of each of said rows; and
   repeating the fruit removing and transporting steps.

5. The harvesting method of claim 4 further comprising the step of laying a length of material on the soil on one side of the vehicle and wherein the conveying step conveys the removed fruit onto the material.

* * * * *